G. D. PARKER.
FRUIT SIZER.
APPLICATION FILED DEC. 27, 1917.

1,272,307.

Patented July 9, 1918.
2 SHEETS—SHEET 1.

WITNESS:
Wm F. Drew

INVENTOR.
George D. Parker
BY
Acker & Tolan
ATTORNEYS.

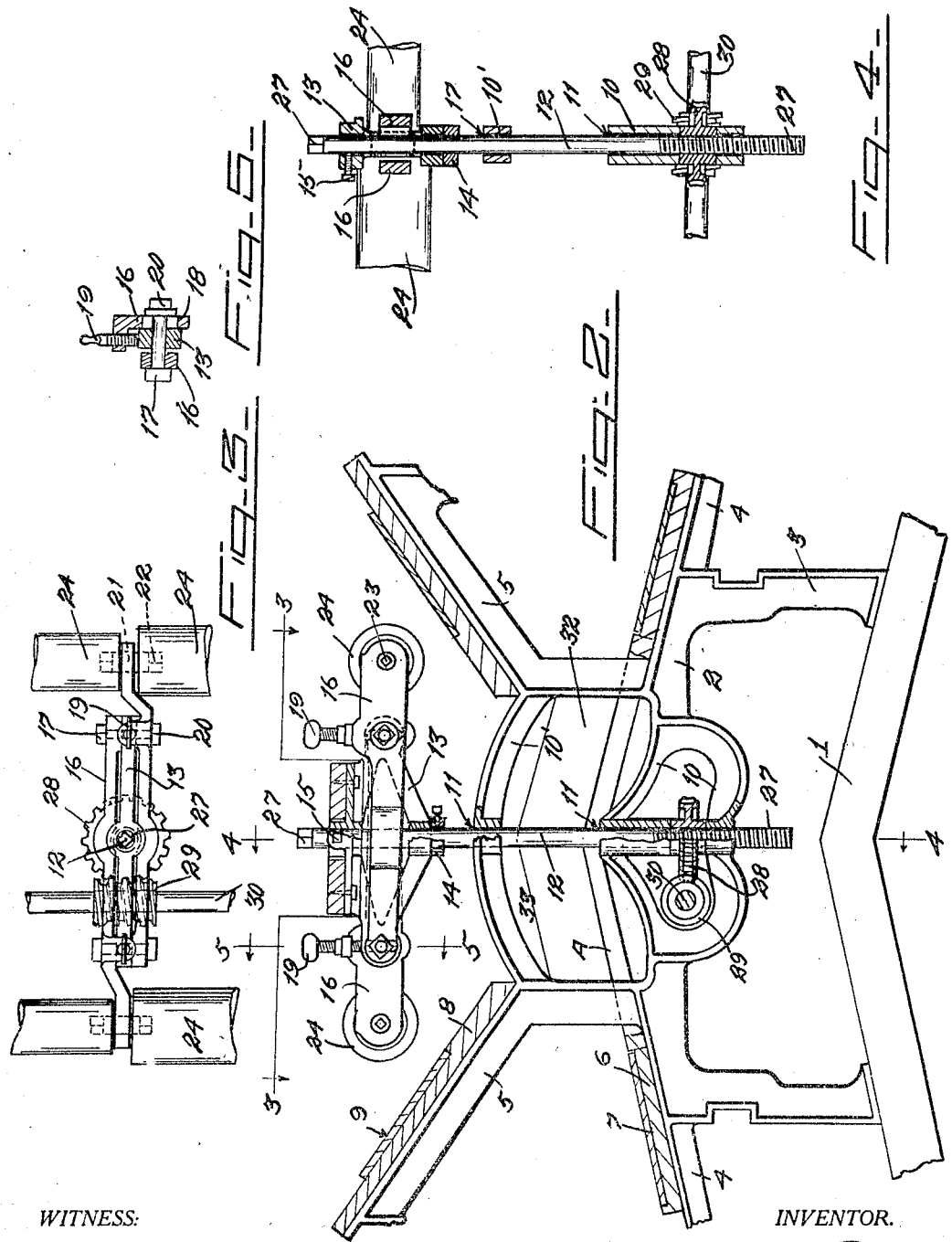

UNITED STATES PATENT OFFICE.

GEORGE D. PARKER, OF RIVERSIDE, CALIFORNIA.

FRUIT-SIZER.

1,272,307.  Specification of Letters Patent.  Patented July 9, 1918.

Application filed December 27, 1917. Serial No. 209,014.

*To all whom it may concern:*

Be it known that I, GEORGE D. PARKER, a citizen of the United States, residing at Riverside, in the county of Riverside and State of California, have invented certain new and useful Improvements in Fruit-Sizers, of which the following is a specification.

This invention relates to improvements in fruit sizers and more particularly to that of the double or duplex type of sizer. The principal objects of the invention are to provide a construction wherein the corresponding walls of corresponding size outlet openings are capable of being simultaneously adjusted the same distance relative to their respective coöperative walls to correspondingly vary the size openings controlled thereby; one wherein the adjacent ends of corresponding walls of corresponding size outlet openings may be simultaneously adjusted uniformly relatively to their respective coöperating walls without affecting the adjustment of the remaining corresponding adjustable walls, thereby correspondingly varying only those size outlet openings controlled by the adjusted walls; and one wherein the adjustable wall of any given size outlet opening is capable of independent adjustment thereby varying only that size outlet opening controlled thereby, and to provide a sizer wherein corresponding discharge outlets of the respective runways are so arranged as to direct the sized fruit passing therethrough to a common point.

The invention consists broadly in providing a duplex sizer, wherein one wall of each size outlet opening is preferably in the form of a sizing roll and wherein said rolls are supported by simultaneously adjustable standards, the standards being in turn independently adjustable and the rolls being directly supported by means independently adjustable relative to the standards, whereby a variety of adjustment of the sizing rolls either simultaneously or independently is provided, and wherein corresponding discharge outlets discharge the sized fruit therefrom to a common point.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Fig. 2 is a transverse sectional view taken adjacent the meeting ends of the sizing rolls and illustrating more particularly the slope of one grading wall of each opening and the means for adjusting the rolls forming the other wall.

Fig. 3 is a sectional view taken on the line 3—3 of Fig. 2.

Fig. 4 is a vertical sectional view taken on line 4—4 of Fig. 2, illustrating the construction of one of the supporting standards and the frame associated therewith.

Fig. 5 is a vertical sectional view taken on line 5—5, Fig. 2, illustrating the arrangement of the roll supporting means relative to their supporting frame.

Figure 1:
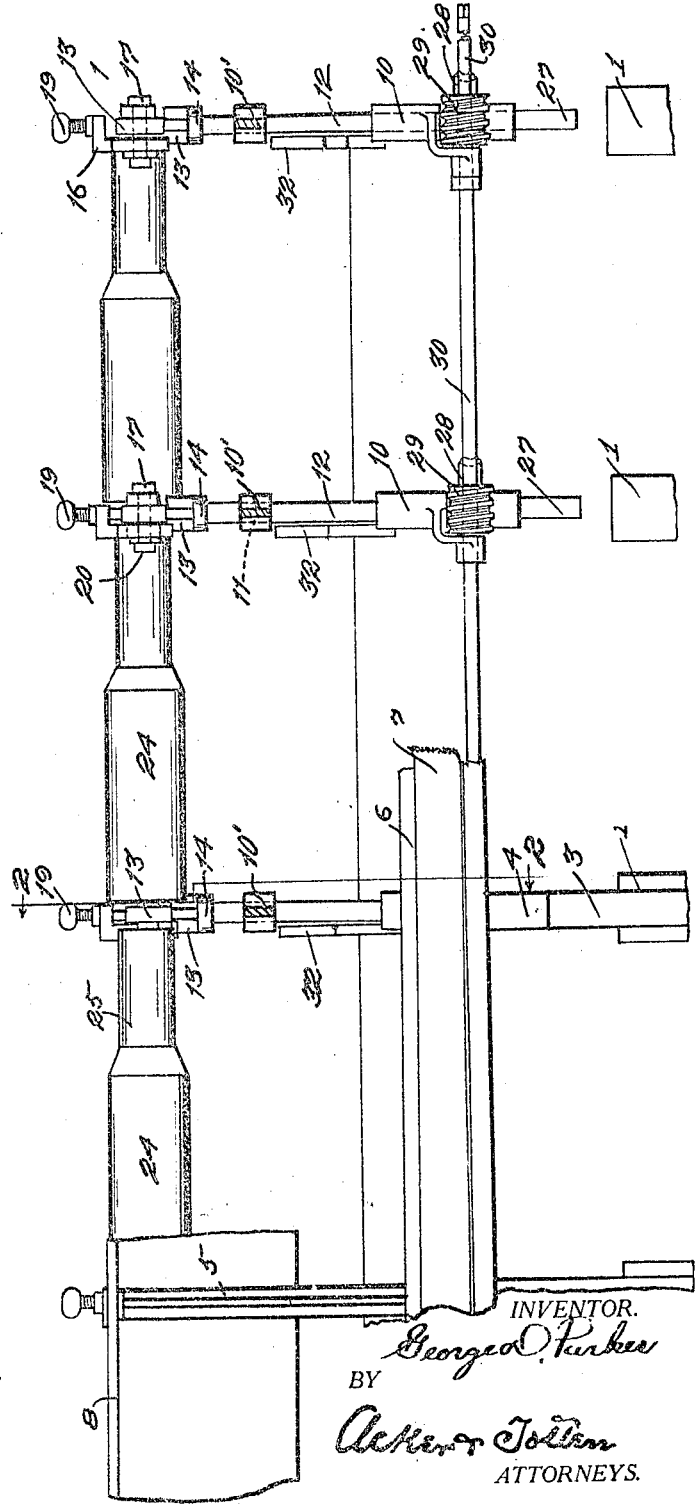
Figure 1 is a view in broken side elevation of a duplex sizer illustrating the preferred embodiment of my invention applied thereto.

In the drawings, wherein like characters of reference designate corresponding parts, 1 indicates suitable bases arranged in a row in parallel spaced relation on each of which is positioned a supporting frame 2, each preferably in the form of a casting provided with supporting legs 3, the oppositely disposed outwardly inclined distributer runway supporting arms 4 and the oppositely disposed inwardly inclined fruit conveyer runway supporting arms 5 positioned one above each of said arms 4. Extending longitudinally of the base 1, and resting on the corresponding arms 4 at each side of the frame 2 are the channeled distributing belt supporting members 6 connecting said arms and longitudinally of which extend the longitudinally movable distributer belts 7 seated in the channels, and of any well known construction.

Connecting and resting on the corresponding arms 5 of adjacent frames 2 are the channeled conveyer belt supporting runway members 8, and longitudinally within the channels of which are received the longitudinally movable conveyer belts 9. The coöperating members 8 and 9 forming runways at opposite sides of the frame 2 are inclined toward each other with the adjacent edges of members 8 in parallel spaced relation, said runways each providing one wall of a size outlet opening.

Suitable transverse braces 10 and 10' are provided in the respective frames 2, and said braces are formed preferably in their centers with the alined vertically disposed guide openings 11 within which are positioned the roll supporting frame standards 12 vertically adjustable within said guide openings. A roll arm supporting frame 13 is carried at the upper end of each standard 12, the frames being provided centrally in their length with openings through which the upper ends of the supporting standards extend. A suitable collar 14 clamped to each standard supports the respective frames on the respective standards and permits rotation of the standards relative to the frames. A clamping or set screw 15 extending through one of the openings in each frame is adapted for engaging the standard associated therewith to prevent accidental rotation of the standard relative thereto. The roll arm supporting frames are disposed at right angles to the fruit runways, and disposed parallel with said frames and positioned one at each side thereof are the roll supporting arms 16, the said arms being pivotally mounted at their opposite ends to the opposite ends of the frame to swing on a horizontal axis by the bolts 17 passing through said arms. The free ends of the respective arms are provided with the transversely disposed elongated slots 18 through which extend one end of the respective bolts 17, pivotally supporting the other arm. A suitable thumb screw 19 is carried by the free end of each arm 16, and the same bear on the upper edge of the frame, providing a means for raising and lowering the free ends of said arms 16 relatively to the frame on the release of the nuts 20 at the ends of bolts 17. The outer ends of the arm 16 are slightly offset to lie in alinement with the frame 13, and rotatably mounted in a bearing 21 therein, is a shaft 22 preferably squared at its ends as at 23 and connecting sizing rollers 24 of the well known type, arranged in parallel spaced relation above the respective fruit runways. Each roller 24 is preferably provided with a single step or grade portion 25 within its length and said interconnected end to end rolls are adapted to be rotated in unison in the direction of the arrow, Fig. 2 of the drawings, by any suitable mechanism, and are also capable of being slightly inclined relative to each other at the connecting points between the same. The rolls provide the opposite wall of the respective size outlet openings and are adapted to be adjusted relatively to their coöperating walls to provide a series of graduated discharge outlets longitudinally of the sizer. If desirable, the frames 13 may be connected by a brace or member 26' which retains the same steady and prevents axial rotation thereof on their respective standards.

The upper end of each standard 12 is squared as at 26 and the lower end is threaded as at 27' passing through a threaded bore of an adjusting gear 28 disposed axially within the guide opening in the lower braces 10. Intermeshing with the gear 28 is a worm 29, said worms being interconnected by a shaft 30 rotatable in bearings and extending longitudinally of the base 1. The shaft 30 has a squared end 31 for receiving a suitable member or wrench, not shown, and on the axial rotation of said shaft the supporting standards 12 will all be simultaneously adjusted a given distance vertically, thereby simultaneously varying to an exact degree the discharge outlets formed between the runways and the respective sizing rolls.

When it is desired to adjust the adjacent ends of the sizing rolls coöperating with any given frame to correspondingly vary the discharge outlets controlled thereby, the same may be accomplished by releasing the set screw 15 carried by the frame supporting ends of said roll it is desired to adjust, and through any form of wrench fitted on the square end 27 rotating the released standard 12 to adjust the same within its coöperating supporting gear 28. This operation will adjust that frame carried by the adjusted standard without in any manner affecting the position of the other frames or standards. Should it be desired to adjust corresponding ends of any given pair of sizing rolls at one side of the sizer to vary the discharge outlet controlled thereby, it is only necessary to release the nut 20 and rotate the thumb screw 19 which will accomplish the desired adjustment without in any manner affecting the position of the remaining rollers. If necessary the division or partition members 32 may extend transversely across the common discharge outlet 33 formed between the spaced edges of the conveyers to prevent the intermixing of the sized fruit after passing through the coöperating discharge openings at opposite sides of the common outlet.

The fruit to be sized is delivered to the respective conveyer belts or runways 9 and is conveyed longitudinally thereof until it registers with a discharge outlet of sufficient size to permit it to pass between the roller 24 and the runway, the two forming opposing walls of the opening. After being sized the fruit drops through the common discharge outlet onto the runway A and from there rolls by gravity onto the distributing runways or belts 7, or it may be conveyed from the sizer in any suitable manner, the disposal of the sized fruit from the sizer not forming any part of my invention.

However, it will be understood that by forming the longitudinally disposed opening between the runways, a common discharge for the sized fruit from the respective graduated discharge openings is provided, thereby enabling the sized fruit from both runways of any given size to be directed to any suitable point after passing through said discharge.

Having thus described my invention, what I claim as new and desire to protect by Letters Patent is:—

1. A fruit sizer having a plurality of parallel fruit runways each composed of parallel spaced wall members, one wall member of each runway formed of a plurality of independent interconnected rolls arranged end to end and providing a series of graduated discharge outlets for the escape of the sized fruit therethrough, and means for simultaneously adjusting the roll wall members of said parallel runways to simultaneously vary all of said discharge outlets.

2. A fruit sizer having a plurality of parallel fruit runways each composed of parallel spaced wall members, one wall member of each runway formed of a plurality of independent interconnected rolls arranged end to end and providing a series of graduated discharge outlets for the escape of the sized fruit therethrough, and means for simultaneously or selectively adjusting the roll wall members of each runway relatively to their coöperating wall members to vary the discharge outlet formed thereby.

3. A sizer having a plurality of parallel fruit runways each composed of parallel spaced wall members, one wall member of each runway consisting of a plurality of united roller sections connected for rotation in unison and capable of flexible movement at their points of interconnection, said wall members providing a series of graduated discharge outlets for the escape of the sized fruit therethrough, and means for simultaneously adjusting the adjacent ends of corresponding roller sections of opposite runways to vary the discharge outlet formed thereby.

4. A sizer having a plurality of parallel fruit runways each composed of parallel spaced wall members, one wall member of each runway consisting of a plurality of united roller sections connected for rotation in unison and capable of flexible movement at their points of interconnection, said wall members providing a series of graduated discharge outlets for the escape of the sized fruit therethrough, and means for simultaneously and selectively adjusting the adjacent ends of corresponding roller sections of each runway to vary the discharge outlet formed thereby.

5. A sizer having a plurality of parallel fruit runways each composed of parallel spaced wall members, said members providing a series of graduated discharge outlets for the escape of the sized fruit therethrough, certain corresponding wall members of each runway being downwardly inclined toward each other with their adjacent edges in spaced relation to provide a common escape between the same for sized fruit from corresponding outlets.

6. A sizer having a plurality of parallel fruit runways each composed of parallel spaced wall members, said members providing a series of oppositely disposed graduated discharge outlets for the escape of the sized fruit therethrough, certain corresponding wall members of each runway being downwardly inclined toward each other with their adjacent edges in spaced relation to provide a common escape between the same for sized fruit from oppositely disposed outlets.

7. A sizer having a plurality of parallel fruit runways each composed of parallel spaced wall members, said members providing a series of graduated discharge outlets for the escape of the sized fruit therethrough, certain corresponding wall members of each runway consisting of a plurality of united roller sections connected for rotation and capable of independent adjustment to vary the discharge outlet formed thereby, the other corresponding wall members of each runway being downwardly inclined toward each other with their adjacent edges in spaced relation to provide a common escape for sized fruit from corresponding outlets.

8. A fruit sizer provided with a central longitudinally disposed opening forming a common discharge outlet for the sized fruit, a plurality of associated parallel fruit runways situated above the centrally disposed outlet and each runway provided with a series of graduated openings for the escape of fruit as sized, corresponding openings being arranged at opposite sides of said longitudinal opening.

9. A fruit sizer having a plurality of parallel fruit runways each composed of parallel spaced wall members providing a series of graduated discharge outlets for the escape of the sized fruit therethrough, corresponding wall members of said runways comprising units adapted for adjustment relatively to the other corresponding wall members of said runways to vary said discharge outlets, a plurality of frames mounting said adjustable units of the respective runways, and an adjustable supporting standard associated with each frame.

10. A fruit sizer having a plurality of parallel fruit runways each composed of parallel spaced wall members providing a series of graduated discharge outlets for the escape of the sized fruit therethrough, corresponding wall members of said runways comprising units adapted for adjustment relatively to the other corresponding wall members of said runways to vary said discharge outlets, a plurality of frames mounting said adjustable units of the respective runways, an adjustable supporting standard associated with each frame, and means whereby said standards may be simultaneously adjusted.

11. A fruit sizer having a plurality of parallel fruit runways each composed of parallel spaced wall members providing a series of graduated discharge outlets for the escape of the sized fruit therethrough, corresponding wall members of said runways comprising units adapted for adjustment relatively to the other corresponding wall members of said runways to vary said discharge outlets, a plurality of frames mounting said adjustable units of the respective runways, and a supporting standard associated with each frame, said standards capable of independent adjustment relatively to each other.

12. A fruit sizer having a plurality of parallel fruit runways each composed of parallel spaced wall members providing a series of graduated discharge outlets for the escape of the sized fruit therethrough, corresponding wall members of said runways comprising units adapted for adjustment relatively to the other corresponding wall members of said runways to vary said discharge outlets, a plurality of frames mounting said adjustable units of the respective runways, a supporting standard associated with each frame, each of said standards adapted for independent adjustment, and means for simultaneously adjusting said standards.

13. A fruit sizer having a plurality of parallel fruit runways each composed of parallel spaced wall members providing a series of graduated discharge outlets for the escape of the sized fruit therethrough, corresponding wall members of said runways comprising units adapted for adjustment relatively to the other corresponding wall members of said runways to vary said discharge outlets, a plurality of frames mounting said adjustable units of the respective runways, and a standard supporting each of said frames, said standards capable of axial rotation to permit of the independent adjustment of said frames.

14. A fruit sizer having a plurality of parallel fruit runways each composed of parallel spaced wall members providing a series of graduated discharge outlets for the escape of the sized fruit therethrough, corresponding wall members of said runways comprising units adapted for adjustment relatively to the other corresponding wall members of said runways to vary said discharge outlets, a plurality of frames mounting said adjustable units of the respective runways, a standard supporting each of said frames, means for simultaneously adjusting said standards, each of said standards mounted for axial rotation to permit of the adjustment thereof relatively to each other.

15. A fruit sizer provided with a central longitudinally disposed opening forming a common discharge outlet for the sized fruit, a plurality of associated parallel fruit runways situated above the centrally disposed outlet and each composed of a pair of parallel spaced wall members providing a series of graduated discharge outlets for the escape of the fruit as sized, corresponding wall members of said runways comprising units adapted for adjustment relatively to the other corresponding wall members of said runways to vary said discharge outlets, a plurality of vertically disposed adjustable standards extending upwardly in alinement with said longitudinally disposed opening, and a frame carried by each standard and extending transversely of said longitudinally disposed opening for supporting the adjustable units of adjacent runways.

16. A fruit sizer provided with a central longitudinally disposed opening forming a common discharge outlet for the sized fruit, a plurality of associated parallel fruit runways situated above the centrally disposed outlet and each composed of a pair of parallel spaced wall members providing a series of graduated discharge outlets for the escape of the fruit as sized, corresponding wall members of said runways comprising units adapted for adjustment relatively to the other corresponding wall members of said runways to vary said discharge outlets, a plurality of vertically disposed adjustable standards extending upwardly in alinement with said longitudinally disposed opening, a frame carried by each standard and extending transversely of said longitudinally disposed opening for supporting the adjustable units of adjacent runways, and means for simultaneously adjusting said standards.

17. A fruit sizer provided with a central longitudinally disposed opening forming a common discharge outlet for the sized fruit, a plurality of associated parallel fruit runways situated above the centrally disposed outlet and each composed of a pair of parallel spaced wall members providing a series of graduated discharge outlets for the escape of the fruit as sized, corresponding wall members of said runways comprising units adapted for adjustment relatively to the other corresponding wall members of said runways to vary said discharge outlets, a plurality of vertically disposed adjustable standards extending upwardly in alinement with said longitudinally disposed opening, and a frame carried by each standard and extending transversely of said longitudinally disposed opening for supporting the adjustable units of adjacent runways, said standards capable of independent and simultaneous adjustment.

18. A fruit sizer having a plurality of parallel fruit runways each composed of parallel spaced wall members providing a series of graduated discharge outlets for the escape of the sized fruit, corresponding wall members of said runways comprising units adapted for adjustment relatively to the other corresponding wall members of said runways to vary said discharge outlets, means for mounting the adjustable units of the respective runways, and means whereby all of said units may be adjusted simultaneously as a unit or independently adjusted, or adjacent ends of adjacent units of one runway may be simultaneously adjusted, or the adjacent ends of adjacent units of said runways may be simultaneously adjusted.

19. A fruit sizer having a plurality of parallel fruit runways each composed of parallel spaced wall members providing a series of graduated discharge outlets for the escape of the sized fruit therethrough, corresponding wall members of said runways comprising units adapted for adjustment relatively to the other corresponding wall members of said runways to vary said discharge outlets, a plurality of unit supporting frames extending transversely over said runways, adjustable means carried adjacent the ends of said frames for engaging and supporting corresponding units of opposing runways whereby said units are capable of independent adjustment relatively to said frames, adjustable standards for supporting said frames, said standards capable of independent adjustment, and means for simultaneously adjusting all of said standards.

In testimony whereof I have signed my name to this specification in the presence of two subscribing witnesses.

GEORGE D. PARKER.

Witnesses:
HARRY A. TOTTEN,
WM. F. DREW.